US011548562B2

(12) United States Patent
Soshino et al.

(10) Patent No.: US 11,548,562 B2
(45) Date of Patent: Jan. 10, 2023

(54) VEHICLE BODY REAR PART STRUCTURE

(71) Applicant: Honda Motor Co., Ltd., Tokyo (JP)

(72) Inventors: Hironori Soshino, Tokyo (JP); Mari Takeuchi, Tokyo (JP); Ryoji Inaba, Tokyo (JP); Tatsuya Ohishi, Tochigi (JP); Izuru Sato, Tokyo To (JP)

(73) Assignee: Honda Motor Co., Ltd., Tokyo (JP)

( * ) Notice: Subject to any disclaimer, the term of this patent is extended or adjusted under 35 U.S.C. 154(b) by 1 day.

(21) Appl. No.: 17/481,292

(22) Filed: Sep. 21, 2021

(65) Prior Publication Data
US 2022/0097772 A1 Mar. 31, 2022

(30) Foreign Application Priority Data

Sep. 30, 2020 (JP) .............................. JP2020-165519

(51) Int. Cl.
B62D 25/04 (2006.01)
B62D 27/02 (2006.01)
B62D 25/06 (2006.01)
B62D 25/08 (2006.01)

(52) U.S. Cl.
CPC ........... *B62D 25/04* (2013.01); *B62D 25/088* (2013.01); *B62D 27/023* (2013.01)

(58) Field of Classification Search
CPC ...... B62D 25/04; B62D 25/06; B62D 25/088; B62D 27/023
USPC .......................... 296/193.06, 203.04, 29, 30
See application file for complete search history.

(56) References Cited

FOREIGN PATENT DOCUMENTS

| JP | 2010234955 A | * 10/2010 |
| JP | 6402250 | 10/2018 |
| JP | 2019182282 A | * 10/2019 |

* cited by examiner

Primary Examiner — Dennis H Redder
(74) Attorney, Agent, or Firm — JCIPRNET

(57) ABSTRACT

Provided is a vehicle body rear part structure. The vehicle body rear part includes a rear pillar, a damper housing and a gusset. The rear pillar forms a closed cross section by joining a pillar outer to a pillar inner. The gusset connects the damper housing and the rear pillar. The pillar inner is separated into a front inner plate and a rear inner plate with a position above a top wall of the damper housing as a boundary. Bulkhead parts are formed on end edges of the front inner plate and the rear inner plate that face a separation part by bending to have a substantially L-shaped cross section to reinforce the closed cross section between the pillar outer and the bulkhead parts. An upper part of the gusset is combined to the rear pillar to close the separation part.

20 Claims, 7 Drawing Sheets

VEHICLE BODY REAR PART STRUCTURE

CROSS-REFERENCE TO RELATED APPLICATION

This application claims the priority benefit of Japan application serial no. 2020-165519, filed on Sep. 30, 2020. The entirety of the above-mentioned patent application is hereby incorporated by reference herein and made a part of this specification.

BACKGROUND

Technical Field

The disclosure relates to a vehicle body rear part structure.

Description of Related Art

A vehicle body rear part structure is known in which a rear pillar that extends from a rear part toward a roof side part on left and right sides of a vehicle body and a damper housing that covers an upper region of a rear damper on the left and right sides of the vehicle body is connected by a gusset (for example, see Patent Document 1).

In the vehicle body rear part structure described in Patent Document 1, the rear pillar that has a structure with a closed cross section is formed by combining a pillar outer on a vehicle outer side and a pillar inner on a vehicle inner side to each other, and the upper end of the gusset that has a substantially U-shaped cross section continuous in an up-down direction is joined to a lower region of the rear pillar. The lower end of the gusset is combined to the damper housing. Further, a pair of bulkheads (reinforcing walls) are attached to the closed cross section of the rear pillar to be aligned with the positions of the front wall and the rear wall of the gusset.

In this vehicle body rear part structure, the load in the up-down direction input from the rear damper to the damper housing is supported by the rear pillar through the gusset and the bulkheads.

RELATED ART

Patent Document

[Patent Document 1] Japanese Patent No. 6402250

In the vehicle body rear part structure described in Patent Document 1, a pair of bulkheads are attached to the closed cross section of the rear pillar to be aligned with the positions of the front wall and the rear wall of the gusset. The bulkhead is joined to the inner surface of the rear pillar by welding or the like. Therefore, it is difficult to attach the bulkhead to the inner surface of the rear pillar.

Further, in the vehicle body rear part structure described in Patent Document 1, when the bulkhead is welded and fixed to the inner surface of the rear pillar, or when the pillar outer of the rear pillar is welded and fixed to the upward extending wall of the damper housing on the vehicle outer side, it is necessary to provide a plurality of openings for welding work in the rear pillar. In this case, a reinforcing member must be added in order to avoid a decrease in the rigidity of the rear pillar due to the openings.

Therefore, the disclosure provides a vehicle body rear part structure capable of facilitating manufacture while ensuring sufficient rigidity of the rear pillar.

SUMMARY

In view of the above, the vehicle body rear part structure according to the disclosure adopts the following configurations.

That is, a vehicle body rear part structure according to an embodiment of the disclosure includes: a rear pillar (for example, the rear pillar 10 of the embodiment) that extends from a rear part on left and right sides of a vehicle body toward a roof side part of the vehicle body and that forms a closed cross section by joining a pillar outer (for example, the pillar outer 10*o* of the embodiment) on a vehicle outer side and a pillar inner (for example, the pillar inner 10*i* of the embodiment) on a vehicle inner side to each other; a damper housing (for example, the damper housing 13 of the embodiment) that covers an upper region of a rear damper; and a gusset (for example, the gusset 14 of the embodiment) that connects the damper housing and the rear pillar. The pillar inner is configured to be separated into a front inner plate and a rear inner plate with a position above a top wall (for example, the top wall 13*b* of the embodiment) of the damper housing as a boundary. A separation part (for example, the separation part 15 of the embodiment) is disposed between the front inner plate and the rear inner plate. Bulkhead parts (for example, the bulkhead parts 16 and 17 of the embodiment) are formed on end edges of the front inner plate and the rear inner plate that face the separation part by bending to have a substantially L-shaped cross section to reinforce the closed cross section between the pillar outer and the bulkhead parts. An upper part of the gusset is combined to the front inner plate and the rear inner plate to close the separation part.

DESCRIPTION OF THE EMBODIMENTS

Figure 1:
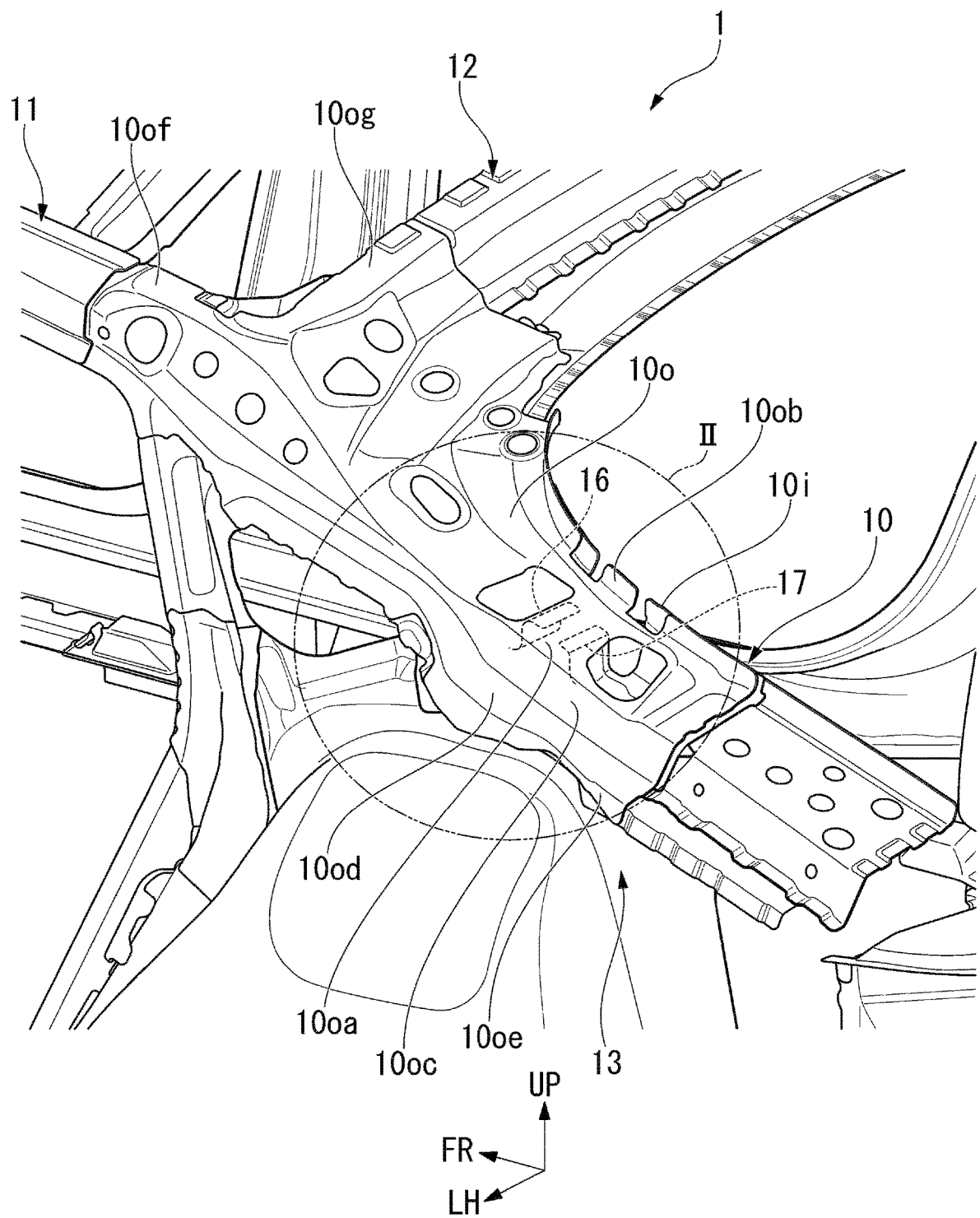
FIG. 1 is a perspective view showing a rear part of a vehicle of the embodiment.

In the above-described vehicle body rear part structure, the bulkhead parts are formed in advance on the front inner plate and the rear inner plate of the pillar inner at the time of manufacturing, and the front inner plate and the rear inner plate are bonded to the pillar outer in this state. After this, the gusset is combined to the damper housing and the rear pillar, and the upper part of the gusset closes the separation part between the front inner plate and the rear inner plate. By adopting this vehicle body rear part structure, it is possible to facilitate the manufacture while ensuring sufficient rigidity of the rear pillar.

The bulkhead parts may be combined to the pillar outer.

In this case, since the bulkhead parts integrally formed with the pillar inner are combined to the pillar outer at a position facing the separation part, a strong cross section of the rear pillar can be obtained. Further, since the separation part of the pillar inner is closed by the upper part of the gusset, the rigidity of the rear pillar can be further increased.

The upper part of the gusset may be combined to a surface of the pillar inner that is substantially orthogonal to a vehicle width direction.

In this case, the input load in the up-down direction input from the rear damper is received by the pillar inner as a shear load through the upper part of the gusset. Therefore, the support rigidity of the rear damper is increased, and the steering stability of the vehicle is increased.

The pillar outer may have a flange part (for example, the flange part 10ob of the embodiment) that extends substantially orthogonal to the vehicle width direction at an end part on an inner side in the vehicle width direction at a position corresponding to the separation part of the pillar inner, and the gusset may be combined to the flange part of the pillar outer and a surface of the damper housing that is substantially orthogonal to the vehicle width direction.

In this case, the input load in the up-down direction input from the rear damper is transmitted to the pillar inner and pillar outer through the gusset. At this time, the load input from the damper housing to the gusset is received by the gusset as a shear load, and the load input from the gusset to the pillar inner and the pillar outer is received by the pillar inner and the pillar outer as a shear load. Therefore, when this configuration is adopted, the support rigidity of the rear damper can be increased, and the steering stability of the vehicle can be further increased.

The gusset may be configured by a plurality of gusset plates (for example, the front gusset plate 14F and the rear gusset plate 14R of the embodiment) divided into front and rear parts.

In this case, since each gusset plate can be individually combined to the rear pillar, the damper housing, and the like, the combination work of the gusset can be easily and accurately performed.

One of the plurality of gusset plates may be formed with a closing part (for example, the flange part 14b of the embodiment) that closes a gap between side surfaces of the front inner plate and the rear inner plate due to the separation part.

In this case, since the gap between the side surfaces of the front inner plate and the rear inner plate is closed by the closing part of one gusset plate, the strength of the combined part between the front inner plate and the rear inner plate can be further increased.

The pillar outer may be combined to the rear inner plate and the front inner plate across the separation part, and may be branched into a front extension part (for example, the front extension part 10of of the embodiment) whose front side extends forward and an inner extension part (for example, the inner extension part 10og of the embodiment) which extends to an inner side in a vehicle width direction, and the front extension part may be combined to a roof side rail (for example, the roof side rail 11 of the embodiment), and the inner extension part may be combined to a rear roof arch (for example, the rear roof arch 12 of the embodiment).

In this case, the load input from the rear damper to the damper housing can be distributed to the structure on the roof side via the gusset and the rear pillar. Therefore, when this configuration is adopted, the support rigidity of the rear damper can be increased, and the steering stability of the vehicle can be further increased.

The gusset may have a U-shaped cross section part (for example, the U-shaped cross section part 14a of the embodiment) that has a substantially U-shaped cross section continuous in an up-down direction, and the bulkhead parts of the front inner plate and the rear inner plate may be disposed to be aligned with extending directions of a front ridge line (for example, the ridge line L1 of the embodiment) and a rear ridge line (for example, the ridge line L2 of the embodiment) of the U-shaped cross section part.

In this case, by aligning the extending directions of the front and rear bulkhead parts of the rear pillar and the front and rear ridge lines of the gusset, the strength and rigidity of the combined body of the gusset and the rear pillar are increased. Therefore, the load input from the rear damper to the damper housing can be stably supported by the combined body of the gusset and the rear pillar having high strength and rigidity.

A front reinforcing member (for example, the front reinforcing member 30 of the embodiment) and a rear reinforcing member (for example, the rear reinforcing member 31 of the embodiment) may be attached to the damper housing to be aligned with the extending directions of the front ridge line and the rear ridge line of the U-shaped cross section part.

In this case, the load input from the rear damper to the damper housing can be more stably supported by the combined body of the damper housing, the gusset, and the rear pillar having high strength and rigidity.

The damper housing may have a joint flange (for example, the joint flange 13c of the embodiment) that extends upward from an end part of the top wall on an outer side in a vehicle width direction, and the pillar outer may have a joint wall (for example, the joint wall 10oe of the embodiment) that comes into contact with the joint flange from the outer side in the vehicle width direction and is joined to the joint flange, and in the pillar inner, a lower wall of the pillar inner may be set lower than an upper end part of the joint flange, and the separation part that has a wider front-rear width than the joint flange may be disposed at a position on an inner side of the joint flange in the vehicle width direction.

In this case, the cross section of the rear pillar can be made low and small, and when the rear pillar is assembled to the damper housing, the joint wall of the pillar outer is moved substantially horizontally from the outer side in the vehicle width direction to abut the joint flange of the damper housing, and the joint wall and the joint flange can be easily welded and fixed. At this time, though the lower wall of the pillar inner is lower than the upper end part of the joint flange, since the separation part is disposed at a position on the pillar inner corresponding to the joint flange (the position on the inner side of the joint flange in the vehicle width direction), it is possible to prevent the pillar inner from interfering with the joint flange.

In the disclosure, since the bulkhead parts are formed by bending on the end edges, which face the separation part, of the front inner plate and the rear inner plate, the bulkhead parts that reinforce the closed cross section of the rear pillar can be easily formed on the inner side of the rear pillar.

Further, in the disclosure, since the separation part provided on the pillar inner is closed by the upper part of the gusset combined to the rear pillar, in the state before the gusset is assembled, welding work between the pillar outer and other members can be easily performed through the separation part.

Therefore, when the disclosure is adopted, it is possible to facilitate the manufacture of the vehicle body rear part while ensuring sufficient rigidity of the rear pillar.

Embodiments of the disclosure will be described below with reference to the drawings. In addition, an arrow FR pointing to the front side of the vehicle, an arrow UP pointing to the upper side of the vehicle, and an arrow LH pointing to the left side of the vehicle are shown at appropriate positions in the drawings.

Figure 2:
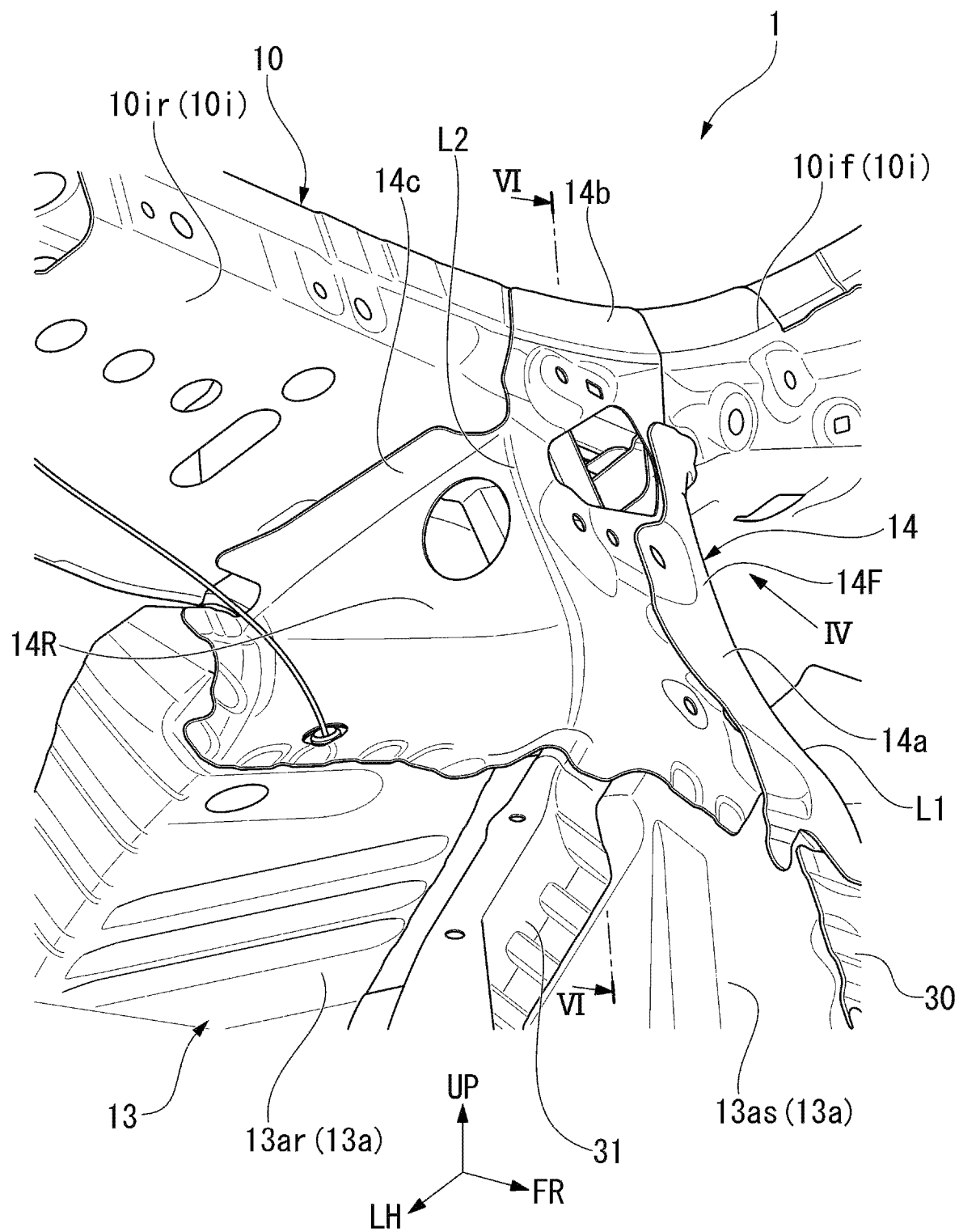
FIG. 2 is a perspective view of the part II of FIG. 1 of the vehicle of the embodiment as viewed from the vehicle inner side.

FIG. 1 is a perspective view of a skeleton part of a rear part of a vehicle 1 of the embodiment as viewed from the diagonally upper left side, and FIG. 2 is a perspective view of the part II of FIG. 1 as viewed from the diagonally lower rear side from the vehicle inner side.

In the vehicle 1 of the embodiment, a rear pillar 10 extending diagonally upward from the rear part side toward the roof side part is disposed on both left and right sides of the rear part of the vehicle body. As shown in FIG. 1, the front end side of the rear pillar 10 is joined to a roof side rail 11 on the left and right sides of the vehicle body and to a rear roof arch 12.

A damper housing 13 that covers the upper region of a rear damper (not shown) on the left and right sides of the vehicle is disposed below a portion close to the upper part of the rear pillar 10 on the left and right sides. The damper housing 13 includes a body part 13a that has a substantially hat-shaped horizontal cross section and a top wall 13b (see FIGS. 3 and 5) that covers the upper end side of the body part 13a and supports the upper end part of the rear damper (not shown).

The upper end portion of the body part 13a connected to the top wall 13b of the damper housing 13 is connected to the rear pillar 10 by a gusset 14. The gusset 14 has a U-shaped cross section part 14a that has a substantially U-shaped cross section continuous in the up-down direction. The lower end portion of the U-shaped cross section part 14a is joined to the upper region of the body part 13a of the damper housing 13. Flange parts 14b, 14c and 14d joined to the rear pillar 10 are disposed extending from the upper end portion of the U-shaped cross section part 14a. The upper end part of the body part 13a of the damper housing 13 and the rear pillar 10 are connected by the gusset 14.

Figure 3:
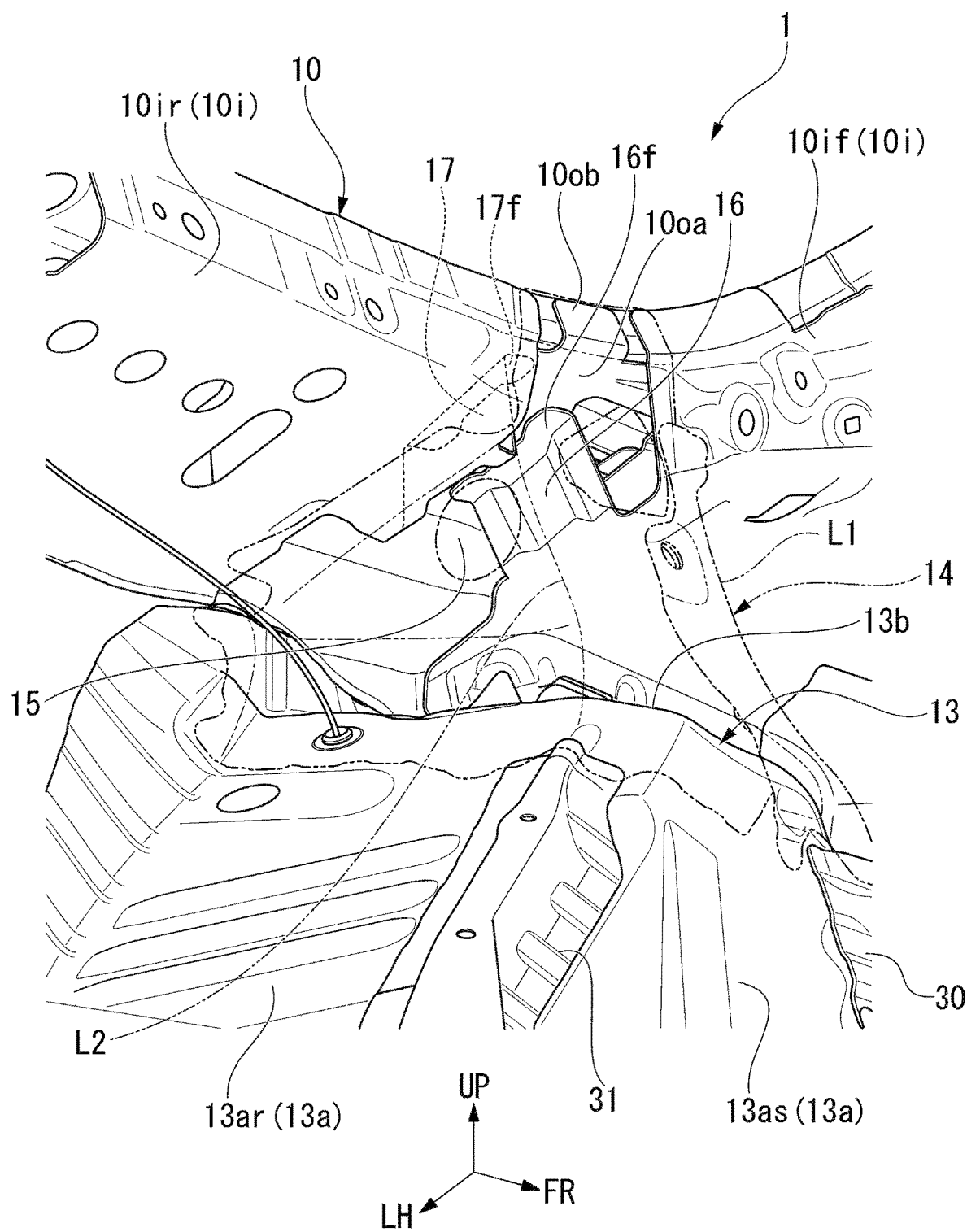
FIG. 3 is a perspective view of the vehicle with the gusset removed from FIG. 2.
Figure 4:
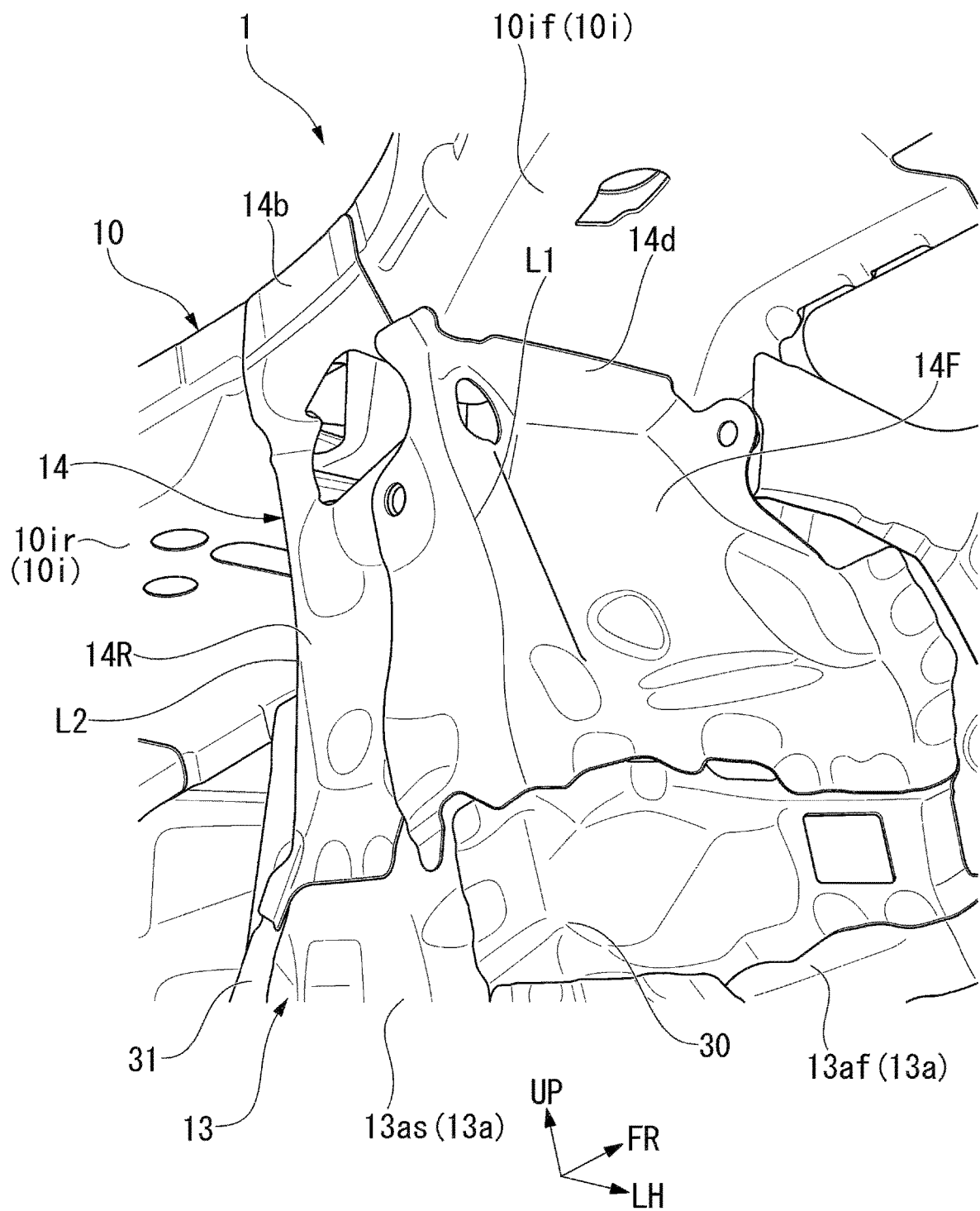
FIG. 4 is a perspective view of the vehicle of the embodiment as viewed from the direction of the arrow IV of FIG. 2.

FIG. 3 is a perspective view with the gusset 14 removed from FIG. 2. Further, FIG. 4 is a view of the vehicle 1 as viewed from the direction of the arrow IV of FIG. 2, and FIG. 5 is a perspective view with the gusset 14 removed from FIG. 4.

The gusset 14 includes a rear gusset plate 14R whose lower end part is joined to a rear wall 13ar and a side wall 13as of the body part 13a of the damper housing 13 and a front gusset plate 14F whose lower end part is joined to a front wall 13af and a portion near the front part of the side wall 13as of the body part 13a of the damper housing 13. That is, the gusset 14 is configured by a plurality of gusset plates. The flange parts 14b and 14c are formed on the upper end part of the rear gusset plate 14R, and the flange part 14d is formed on the upper end part of the front gusset plate 14F.

The rear pillar 10 includes a pillar outer 10o located on the vehicle outer side and a pillar inner 10i located on the vehicle inner side. The rear pillar 10 forms a closed cross section continuous in the front-rear direction of the vehicle body by joining the pillar outer 10o and the pillar inner 10i to each other.

Figure 5:
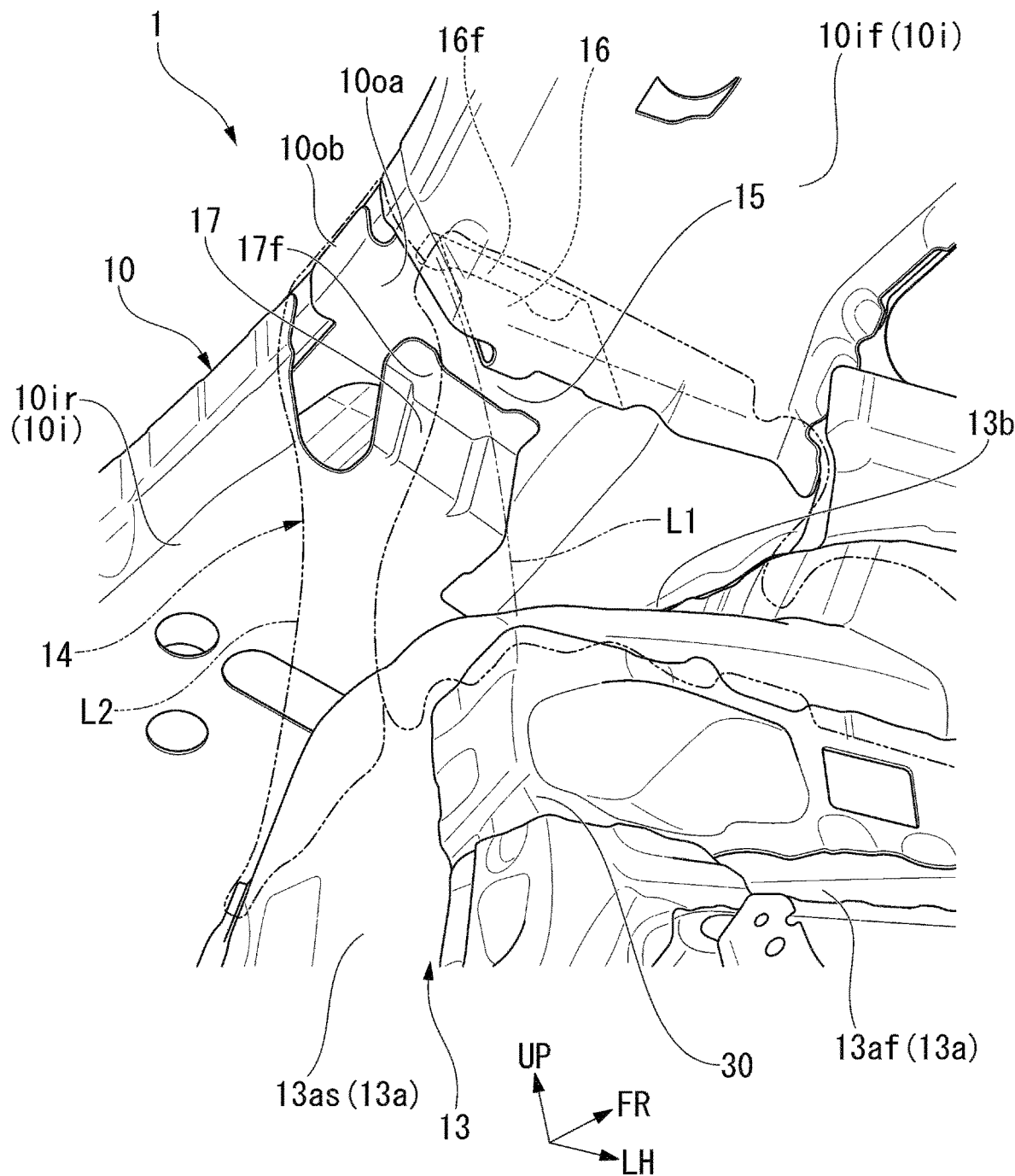
FIG. 5 is a perspective view of the vehicle with the gusset removed from FIG. 4.

As shown in FIGS. 3 and 5, the pillar inner 10i is configured to be separated into a front inner plate 10if and a rear inner plate 10ir with a position above the top wall 13b of the damper housing 13 as a boundary. A separation part 15 is disposed between the front inner plate 10if and the rear inner plate 10ir.

A bulkhead part 16 is formed on the rear end edge of the front inner plate 10if that faces the separation part 15 by bending upward in a substantially L shape to reinforce the closed cross section between the pillar outer 10o and the bulkhead part 16. Similarly, a bulkhead part 17 is formed on the front end edge of the rear inner plate 10ir that faces the separation part 15 by bending upward in a substantially L shape to reinforce the closed cross section between the pillar outer 10o and the bulkhead part 17. Joint flanges 16f and 17f that bend in the direction of the separation part 15 are disposed extending from the tip end parts of the bulkhead parts 16 and 17, respectively. The joint flanges 16f and 17f are joined to the inner side surface of the pillar outer 10o.

Figure 6:
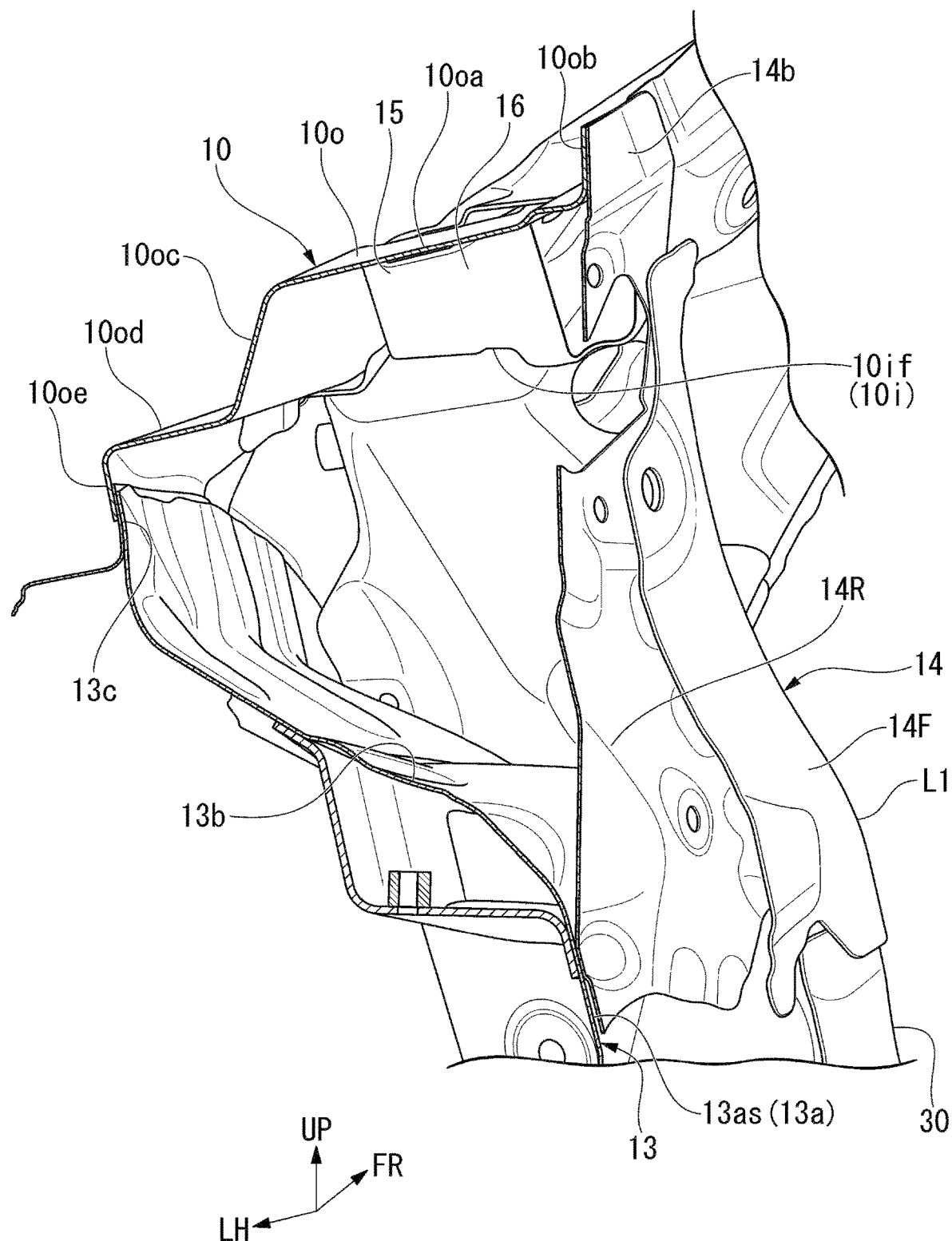
FIG. 6 is a partial cross-sectional perspective view of the vehicle showing the partial cross section taken along the VI-VI line of FIG. 2.
Figure 7:
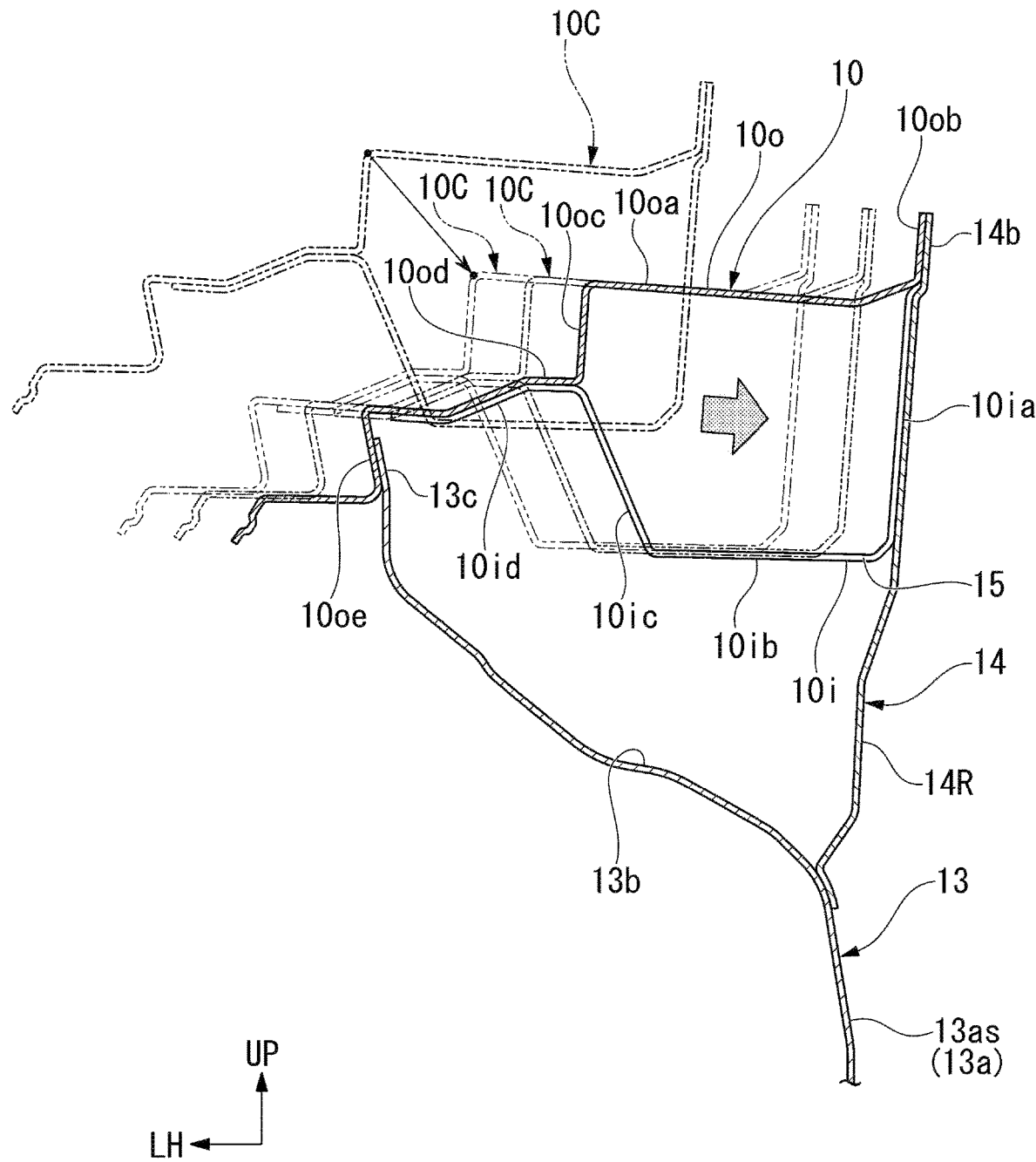
FIG. 7 is a view showing an assembly mode of a conventional example superimposed on a cross section taken along the VI-VI line of FIG. 2.

FIG. 6 is a partial cross-sectional perspective view of a combined body of the damper housing 13, the rear pillar 10 and the gusset 14 showing the cross section taken along the VI-VI line of FIG. 2, and FIG. 7 is a view showing an assembly mode of a conventional example superimposed on the cross-sectional view of the combined body of the damper housing 13, the rear pillar 10 and the gusset 14 taken along the VI-VI line of FIG. 2 by a virtual line.

As shown in FIG. 7, the portion of the pillar inner 10i (the rear inner plate 10ir and the front inner plate 10if) excluding the separation part 15 has a cross-sectional shape having an inner side wall 10ia extending vertically upward from the end part on the inner side in the vehicle width direction, a lower wall 10ib extending substantially horizontally from the lower end of the inner side wall 10ia to the outer side in the vehicle width direction, an outer side wall 10ic extending upward from the end part of the lower wall 10ib on the outer side in the vehicle width direction while inclining to the outer side in the vehicle width direction, and an outer flange 10id extending from the upper end of the outer side wall 10ic to the outer side in the vehicle width direction.

Further, the portion of the pillar outer 10o in the vicinity of the separation part 15 has a cross-sectional shape having an upper wall 10oa extending substantially horizontally, a flange part 10ob extending from the end part of the upper wall 10oa on the inner side in the vehicle width direction and bending vertically upward, an outer side wall 10oc extending from the end part of the upper wall 10oa on the outer side in the vehicle width direction and bending vertically downward, an extension wall 10od extending from the lower end of the outer wall 10oc to the outer side in the vehicle width direction, and a joint wall 10oe extending from the end part of the extension wall 10od on the outer side in the vehicle width direction and bending downward. The flange part 10ob extends from the end part of the pillar outer 10o on the inner side in the vehicle width direction substantially orthogonal to the vehicle width direction.

In the pillar inner 10i and the pillar outer 10o, the upper edge part of the inner side wall 10ia of the pillar inner 10i and the flange part 10ob of the pillar outer 10o are joined, and the outer flange 10id of the pillar inner 10i and the extension wall 10od of the pillar outer 10o are joined.

The pillar outer 10o is combined to the rear inner plate 10ir and the front inner plate 10if across the separation part 15. Further, as shown in FIG. 1, the pillar outer 10o is branched into a front extension part 10of whose front side extends forward and an inner extension part bog which extends to the inner side in the vehicle width direction. The front extension part 10of is combined to the roof side rail 11, and the inner extension part bog is combined to the rear roof arch 12.

Here, the rear flange part 14c of the upper part of the gusset 14 bends backward and extends as shown in FIG. 2, and the front flange part 14d of the upper part of the gusset 14 bends forward and extends as shown in FIG. 4. The rear flange part 14c is joined to the front edge part of the separation part 15 in the lower wall of the rear inner plate 10ir, and the front flange part 14d is joined to the rear edge part of the separation part 15 in the lower wall of the front inner plate 10if.

Further, the central flange part 14b of the upper part of the gusset 14 extends upward in a substantially linear shape. The central flange part 14b is joined to the front edge part of the rear inner plate 10ir and the rear edge part of the front inner plate 10if to cross the gap between the inner side walls of the rear inner plate 10ir and the front inner plate 10if due to the separation part 15 in the front-rear direction. The central flange part 14b is integrally formed on the upper part of the rear gusset plate 14R as described above.

In the embodiment, the central flange part 14b configures a closing part that closes the gap between the side surfaces of the front inner plate 10if and the rear inner plate 10ir. Further, the inner side walls of the rear inner plate 10ir and the front inner plate 10if extend vertically upward, and the surface to which the flange part 14b (the upper part of the gusset 14) is joined is a surface substantially orthogonal to the vehicle width direction.

Further, as shown in FIGS. 3 and 5, the flange part 10ob of the pillar outer 10o on the inner side in the vehicle width direction is exposed in the gap between the side surfaces of the front inner plate 10if and the rear inner plate 10ir due to the separation part 15. The upper edge portion of the central flange part 14b of the gusset 14 is also joined to the flange part 10ob of the pillar outer 10o.

In addition, the lower edge part of the gusset 14 is joined to a surface of the side wall 13as of the damper housing 13 that is substantially orthogonal to the vehicle width direction.

Here, in the U-shaped cross section part 14a of the gusset 14, a front ridge line L1 extending substantially in the up-down direction is disposed at the boundary part between the side wall and the front wall, and similarly, a rear ridge line L2 extending substantially in the up-down direction is disposed at the boundary part between the side wall and the rear wall. The front and rear bulkhead parts 16 and 17 of the rear pillar 10 are formed to be aligned with the front and rear ridge lines L1 and L2 of the gusset 14, as shown in FIGS. 3 and 5.

Further, a front reinforcing member 30 and a rear reinforcing member 31 are attached to the body part of the damper housing 13 to be aligned with the extending directions of the front and rear ridge lines L1 and L2 of the gusset 14. The front reinforcing member 30 has a ridge line that is aligned with the extending direction of the front ridge line L1 of the gusset 14, and the rear reinforcing member 31 has a ridge line that is aligned with the extending direction of the rear ridge line L2 of the gusset 14.

Further, as shown in FIGS. 6 and 7, the top wall 13b of the damper housing 13 is inclined upward toward the outer side in the vehicle width direction. A joint flange 13c extending vertically upward is disposed extending from the end part of the top wall 13b on the outer side in the vehicle width direction. The joint wall 10oe of the pillar outer 10o on the outer side in the vehicle width direction is in contact with the joint flange 13c from the outer side in the vehicle width direction, and the joint wall 10oe is joined by welding in that state.

When the rear pillar 10 is assembled to the upper part of the damper housing 13, the rear pillar 10 is moved from the position on the outer side of the damper housing 13 in the vehicle width direction to the inner side in the vehicle width direction as it is so that the height of the lower wall 10ib of the pillar inner 10i is set to be lower than the upper end part of the joint flange 13c. At this time, since the separation part 15 that has a wider front-rear width than the joint flange 13c is disposed in the pillar inner 10i at a front-rear position corresponding to the joint flange 13c, even if the rear pillar 10 is moved horizontally to the inner side in the vehicle width direction, it is possible to prevent the inner side wall 10ia and the lower wall 10ib of the pillar inner 10i from interfering with the joint flange 13c of the damper housing 13. In this way, when the rear pillar 10 moves to some extent in the vehicle width direction, the joint wall 10oe of the pillar outer 10o comes into contact with a surface of the joint flange 13c of the damper housing 13 on the vehicle outer side and is positioned thereby. The joint wall 10oe of the pillar outer 10o and the joint flange 13c of the damper housing 13 are welded and fixed in this state. Further, the upper part of the gusset 14 is welded and fixed to the rear pillar 10 after this.

Further, in FIG. 7, the assembly mode in the case of a rear pillar 10C of a conventional example in which the pillar inner is not provided with the separation part is shown by a virtual line.

In the case of the rear pillar 10C of the conventional example, when the rear pillar 10C is assembled to the upper part of the damper housing 13, as shown by the arrow in FIG. 7, the rear pillar 10C is moved from the upward position on the outer side of the damper housing 13 in the vehicle width direction to the downward position on the inner side in the vehicle width direction. As a result, it is possible to prevent the inner side wall and the lower wall of the pillar inner from interfering with the joint flange 13c of the damper housing 13. In this way, when the lower wall 10ib of the pillar inner 10i moves further inwardly and downwardly than the upper end part of the joint flange 13c, the rear pillar 10 is horizontally moved in the vehicle width direction. After that, when the joint wall of the pillar outer comes into contact with the surface of the joint flange 13c of the damper housing 13 on the vehicle outer side, the joint wall of the pillar outer and the joint flange 13c of the damper housing 13 are welded and fixed. In the structure of this embodiment as described above, when the rear pillar 10C is assembled to the upper part of the damper housing 13, it is not necessary to move the rear pillar 10C from the upward position on the outer side of the damper housing 13 in the vehicle width direction to the downward position on the inner side in the vehicle width direction.

As described above, since in the vehicle body rear part structure of the embodiment, the bulkhead parts 16 and 17 are formed by bending on the end edges, which face the separation part 15, of the front inner plate 10if and the rear inner plate 10ir of the pillar inner 10i, the bulkhead parts 16 and 17 for reinforcing the closed cross section of the rear pillar 10 can be easily formed inside the rear pillar 10. That is, when the vehicle body rear part structure of the embodiment is adopted, the bulkhead parts 16 and 17 can be formed in advance on the front inner plate 10if and the rear inner plate 10ir of the pillar inner 10i at the time of manufacturing, and the front inner plate 10if and the rear inner plate 10ir can be bonded to the pillar outer 10o in this state.

Further, in the vehicle body rear part structure of the embodiment, since the separation part 15 provided on the pillar inner 10i is closed by the upper part of the gusset 14 combined to the rear pillar 10, in the state before the gusset 14 is assembled, welding work between the pillar outer 10*o* and other members can be easily performed through the separation part 15. Therefore, when the vehicle body rear part structure of the embodiment is adopted, it is possible to facilitate the manufacture of the vehicle body rear part while ensuring sufficient rigidity of the rear pillar 10.

Further, in the vehicle body rear part structure of the embodiment, since the bulkhead parts 16 and 17 integrally formed with the pillar inner 10*i* are combined to the pillar outer 10*o* at a position facing the separation part 15, a strong cross section of the rear pillar 10 can be obtained. Further, since the separation part 15 of the pillar inner 10*i* is closed by the upper part of the gusset 14, the rigidity of the rear pillar 10 can be further increased.

Further, in the vehicle body rear part structure of the embodiment, since the upper part of the gusset 14 is combined to a surface of the pillar inner 10*i* substantially orthogonal to the vehicle width direction, the input load in the up-down direction input from the rear damper can be received as a shear load by the pillar inner 10*i* through the upper part of the gusset 14. Therefore, when this configuration is adopted, the support rigidity of the rear damper can be increased, and the steering stability of the vehicle can be increased.

In particular, in the vehicle body rear part structure of the embodiment, since the upper part of the gusset 14 is also combined to the flange part 10*ob* of the pillar outer 10*o* that extends substantially orthogonal to the vehicle width direction, the input load in the up-down direction input from the rear damper can be received as a shear load not only by the pillar inner 10*i* but also by the pillar outer 10*o*. Therefore, when this configuration is adopted, the support rigidity of the rear damper can be increased, and the steering stability of the vehicle can be further increased.

Further, in the vehicle body rear part structure of the embodiment, the gusset 14 is configured by the rear gusset plate 14R and the front gusset plate 14F which are divided into front and rear parts. In this case, since each gusset plate can be individually combined to the rear pillar 10, the damper housing 13, and the like, the combination work of the gusset 14 can be easily and accurately performed.

Further, in the vehicle body rear part structure of the embodiment, one gusset plate (the rear gusset plate 14R) is provided with the flange part 14*b* (the closing part) that closes the gap between the side surfaces of the front inner plate 10*if* and the rear inner plate 10*ir* due to the separation part 15. Therefore, the strength of the combined part between the front inner plate 10*if* and the rear inner plate 10*ir* can be further increased.

Further, in the vehicle body rear part structure of the embodiment, the front extension part 10*of* of the pillar outer 10*o* is combined to the roof side rail 11, and the inner extension part bog of the pillar outer 10*o* is combined to the rear roof arch 12. Therefore, the load input from the rear damper to the damper housing 13 can be distributed and supported by the structure on the roof side via the gusset 14 and the rear pillar 10. Therefore, when this configuration is adopted, the support rigidity of the rear damper can be further increased, and the steering stability of the vehicle can be further increased.

Further, in the vehicle body rear part structure of the embodiment, the bulkhead parts 16 and 17 of the front inner plate 10*if* and the rear inner plate 10*ir* are disposed to be aligned with the extending directions of the front and rear ridge lines L1 and L2 of the gusset 14. Therefore, the strength and rigidity of the combined body of the gusset 14 and the rear pillar 10 can be increased. Therefore, when this configuration is adopted, the load input from the rear damper to the damper housing 13 can be stably supported by the combined body of the gusset 14 and the rear pillar 10 having high strength and rigidity.

Further, in the vehicle body rear part structure of the embodiment, the front reinforcing member 30 and the rear reinforcing member 31 are attached to the damper housing 13 to be aligned with the extending directions of the front and rear ridge lines L1 and L2 of the gusset 14. Therefore, the load input from the rear damper to the damper housing 13 can be more stably supported by the combined body of the damper housing 13, the gusset 14, and the rear pillar 10 having high strength and rigidity.

Further, in the vehicle body rear part structure of the embodiment, the pillar outer 10*o* includes the joint wall 10*oe* which comes into contact and is joined to the joint flange 13*c* of the damper housing 13 from the outer side in the vehicle width direction, and the lower wall 10*ib* of the pillar inner 10*i* is set lower than the upper end part of the joint flange 13*c*. In addition, the separation part 15 of the pillar inner 10*i* that has a wider front-rear width than the joint flange 13*c* is disposed at a position on the inner side of the joint flange 13*c* of the damper housing 13 in the vehicle width direction. Therefore, the cross section of the rear pillar 10 can be made low and small, and when the rear pillar 10 is assembled to the damper housing 13, the joint wall 10*oe* of the pillar outer 10*o* is moved substantially horizontally from the outer side in the vehicle width direction to abut the joint flange 13*c* of the damper housing 13, and the joint wall 10*oe* and the joint flange 13*c* can be easily welded and fixed.

That is, in the vehicle body rear part structure of the embodiment, since the separation part 15 that has a wider front-rear width than the joint flange 13*c* is disposed at a position on the pillar inner 10*i* corresponding to the joint flange 13*c* (the position on the inner side of the joint flange 13*c* in the vehicle width direction), when the rear pillar 10 is assembled, the joint wall 10*oe* and the joint flange 13*c* can be easily welded and fixed without causing interference between the pillar inner 10*i* and the joint flange 13*c*.

In addition, the disclosure is not limited to the above embodiments, and various design changes can be made without departing from the spirit of the disclosure.

What is claimed is:

1. A vehicle body rear part structure comprising:
    a rear pillar that extends from a rear part on left and right sides of a vehicle body toward a roof side part of the vehicle body and that forms a closed cross section by joining a pillar outer on a vehicle outer side and a pillar inner on a vehicle inner side to each other;
    a damper housing that covers an upper region of a rear damper; and
    a gusset that connects the damper housing and the rear pillar,
    wherein the pillar inner is configured to be separated into a front inner plate and a rear inner plate with a position above a top wall of the damper housing as a boundary,
    a separation part is disposed between the front inner plate and the rear inner plate,
    bulkhead parts are formed on end edges of the front inner plate and the rear inner plate that face the separation part by bending to have a substantially L-shaped cross section to reinforce the closed cross section between the pillar outer and the bulkhead parts, and
    an upper part of the gusset is combined to the front inner plate and the rear inner plate to close the separation part.

2. The vehicle body rear part structure according to claim 1, wherein the bulkhead parts are combined to the pillar outer.

3. The vehicle body rear part structure according to claim 1, wherein the upper part of the gusset is combined to a surface of the pillar inner that is substantially orthogonal to a vehicle width direction.

4. The vehicle body rear part structure according to claim 2, wherein the upper part of the gusset is combined to a surface of the pillar inner that is substantially orthogonal to a vehicle width direction.

5. The vehicle body rear part structure according to claim 3, wherein the pillar outer has a flange part that extends substantially orthogonal to the vehicle width direction at an end part on an inner side in the vehicle width direction at a position corresponding to the separation part of the pillar inner, and
the gusset is combined to the flange part of the pillar outer and a surface of the damper housing that is substantially orthogonal to the vehicle width direction.

6. The vehicle body rear part structure according to claim 4, wherein the pillar outer has a flange part that extends substantially orthogonal to the vehicle width direction at an end part on an inner side in the vehicle width direction at a position corresponding to the separation part of the pillar inner, and
the gusset is combined to the flange part of the pillar outer and a surface of the damper housing that is substantially orthogonal to the vehicle width direction.

7. The vehicle body rear part structure according to claim 1, wherein the gusset is configured by a plurality of gusset plates divided into front and rear parts.

8. The vehicle body rear part structure according to claim 2, wherein the gusset is configured by a plurality of gusset plates divided into front and rear parts.

9. The vehicle body rear part structure according to claim 3, wherein the gusset is configured by a plurality of gusset plates divided into front and rear parts.

10. The vehicle body rear part structure according to claim 4, wherein the gusset is configured by a plurality of gusset plates divided into front and rear parts.

11. The vehicle body rear part structure according to claim 5, wherein the gusset is configured by a plurality of gusset plates divided into front and rear parts.

12. The vehicle body rear part structure according to claim 6, wherein the gusset is configured by a plurality of gusset plates divided into front and rear parts.

13. The vehicle body rear part structure according to claim 7, wherein one of the plurality of gusset plates is formed with a closing part that closes a gap between side surfaces of the front inner plate and the rear inner plate due to the separation part.

14. The vehicle body rear part structure according to claim 8, wherein one of the plurality of gusset plates is formed with a closing part that closes a gap between side surfaces of the front inner plate and the rear inner plate due to the separation part.

15. The vehicle body rear part structure according to claim 9, wherein one of the plurality of gusset plates is formed with a closing part that closes a gap between side surfaces of the front inner plate and the rear inner plate due to the separation part.

16. The vehicle body rear part structure according to claim 10, wherein one of the plurality of gusset plates is formed with a closing part that closes a gap between side surfaces of the front inner plate and the rear inner plate due to the separation part.

17. The vehicle body rear part structure according to claim 1, wherein the pillar outer is combined to the rear inner plate and the front inner plate across the separation part, and is branched into a front extension part whose front side extends forward and an inner extension part which extends to an inner side in a vehicle width direction,
the front extension part is combined to a roof side rail, and
the inner extension part is combined to a rear roof arch.

18. The vehicle body rear part structure according to claim 1, wherein the gusset has a U-shaped cross section part that has a substantially U-shaped cross section continuous in an up-down direction, and
the bulkhead parts of the front inner plate and the rear inner plate are formed to be aligned with extending directions of a front ridge line and a rear ridge line of the U-shaped cross section part.

19. The vehicle body rear part structure according to claim 18, wherein a front reinforcing member and a rear reinforcing member are attached to the damper housing to be aligned with the extending directions of the front ridge line and the rear ridge line of the U-shaped cross section part.

20. The vehicle body rear part structure according to claim 1, wherein the damper housing has a joint flange that extends upward from an end part of the top wall on an outer side in a vehicle width direction,
the pillar outer has a joint wall that comes into contact with the joint flange from the outer side in the vehicle width direction and is joined to the joint flange, and
in the pillar inner, a lower wall of the pillar inner is set lower than an upper end part of the joint flange, and the separation part that has a wider front-rear width than the joint flange is disposed at a position on an inner side of the joint flange in the vehicle width direction.

* * * * *